United States Patent
Ueno

(10) Patent No.: US 12,264,722 B2
(45) Date of Patent: Apr. 1, 2025

(54) VIBRATION DAMPING APPARATUS, REACTION FORCE PROCESSING SYSTEM, STAGE APPARATUS, EXPOSURE APPARATUS, SUBSTRATE PROCESSING DEVICE, AND METHOD FOR MANUFACTURING ARTICLE

(71) Applicant: CANON KABUSHIKI KAISHA, Tokyo (JP)

(72) Inventor: Masamichi Ueno, Tochigi (JP)

(73) Assignee: CANON KABUSHIKI KAISHA, Tokyo (JP)

(*) Notice: Subject to any disclaimer, the term of this patent is extended or adjusted under 35 U.S.C. 154(b) by 328 days.

(21) Appl. No.: 17/744,838

(22) Filed: May 16, 2022

(65) Prior Publication Data
US 2022/0373055 A1 Nov. 24, 2022

(30) Foreign Application Priority Data

May 21, 2021 (JP) .................................. 2021-085831

(51) Int. Cl.
*F16F 7/10* (2006.01)
*F16F 7/108* (2006.01)
*F16F 15/02* (2006.01)

(52) U.S. Cl.
CPC .......... *F16F 7/1017* (2013.01); *F16F 7/1011* (2013.01); *F16F 7/108* (2013.01); *F16F 15/022* (2013.01); *F16F 2222/08* (2013.01); *F16F 2228/066* (2013.01); *F16F 2230/18* (2013.01)

(58) Field of Classification Search
CPC ......... F16F 7/1011; F16F 7/1017; F16F 7/108
See application file for complete search history.

(56) References Cited

U.S. PATENT DOCUMENTS

2013/0328254 A1* 12/2013 Kojima ................. F16F 15/022
267/140.15

FOREIGN PATENT DOCUMENTS

| CN | 110573646 A | 12/2019 |
| JP | H05-121294 A | 5/1993 |
| JP | 2017-133639 A | 8/2017 |
| TW | 201941343 A | 10/2019 |

OTHER PUBLICATIONS

TW Office Action issued in corresponding TW Patent Application No. 111114929, dated Nov. 20, 2024, pp. 1-13, with English translation.

* cited by examiner

*Primary Examiner* — Walter H Swanson
(74) *Attorney, Agent, or Firm* — Carter, DeLuca & Farrell LLP

(57) ABSTRACT

A vibration damping apparatus configured to damp a vibration of a target member includes a mass body, a base disposed on the target member, a support member disposed on the base and configured to support the mass body, a housing disposed on the base so as to surround the support member, an elastic member disposed so as to form a space in the housing and configured to apply a force to the support member, and a control unit configured to control a pressure of a fluid in the space by supplying the fluid to the space based on a vibration state of the target member.

16 Claims, 6 Drawing Sheets

VIBRATION DAMPING APPARATUS, REACTION FORCE PROCESSING SYSTEM, STAGE APPARATUS, EXPOSURE APPARATUS, SUBSTRATE PROCESSING DEVICE, AND METHOD FOR MANUFACTURING ARTICLE

BACKGROUND OF THE INVENTION

Field of the Invention

The present invention relates to a vibration damping apparatus, reaction force processing system, a stage apparatus, an exposure apparatus, a substrate processing device, and a method for manufacturing an article.

Description of the Related Art

An exposure apparatus includes a stage (wafer stage or reticle stage) for moving and positioning a wafer or reticle at a high speed, but in driving the stage, a reaction force of an inertial force caused by acceleration or deceleration is transmitted to a platen and shakes or vibrates the platen or floor. Japanese Patent Laid-Open No. ("JP") 5-121294 discloses a photolithography apparatus (reaction force processing system) that generates a compensation force having the same magnitude as that of a generated reaction force in a direction opposite to a direction of the generated reaction force.

There is known a dynamic vibration absorber or dynamic damper that has a spring and a mass body whose natural frequency is the same as a frequency in question, wherein the mass body absorbs vibration of a target and vibrates instead, thereby reducing the vibration of the target. However, in a case where there are a plurality of frequencies in question, the vibration of the target cannot be reduced. Accordingly, JP 2017-133639 discloses a vibration damping apparatus that makes the natural frequency variable using a magnetic elastomer.

In the photolithography apparatus disclosed in JP 5-121294, in the case where the natural frequency of the apparatus that generates the compensation force and the frequency of the compensation force are close to each other, the vibration may increase and deteriorate the performance of the photolithography apparatus. The vibration damping apparatus disclosed in JP 2017-133639 changes the rigidity of rubber by controlling an intensity of a magnetic field, and thus is not applicable to a structure (an actuator using the magnetic force) that generates a magnetic flux such as a linear motor.

SUMMARY OF THE INVENTION

The present invention provides a vibration damping apparatus, a reaction force processing system, a stage apparatus, an exposure apparatus, a substrate processing device, and a method for manufacturing an article, each of which can support an actuator that utilizes a magnetic force.

A vibration damping apparatus according to one aspect of the present invention is configured to damp a vibration of a target member and includes a mass body, a base disposed on the target member, a support member disposed on the base and configured to support the mass body, a housing disposed on the base so as to surround the support member, an elastic member disposed so as to form a space in the housing and configured to apply a force to the support member, and a control unit configured to control a pressure of a fluid in the space by supplying the fluid to the space based on a vibration state of the target member.

A reaction force processing system according to another aspect of the present invention includes the above vibration damping apparatus, a coil, and a magnet. A stage apparatus according to another aspect of the present invention includes a stage and the above vibration damping apparatus. An exposure apparatus according to another aspect of the present invention includes a projection optical system, and the above vibration damping apparatus. A substrate processing apparatus for processing a substrate includes a stage configured to hold the substrate, and the above vibration damping apparatus configured to damp a vibration of the stage. A manufacturing method of an article according to another aspect of the present invention includes the steps of processing a substrate using the above substrate processing apparatus, and manufacturing the article from a processed substrate.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention.

First Embodiment

Figure 1A:
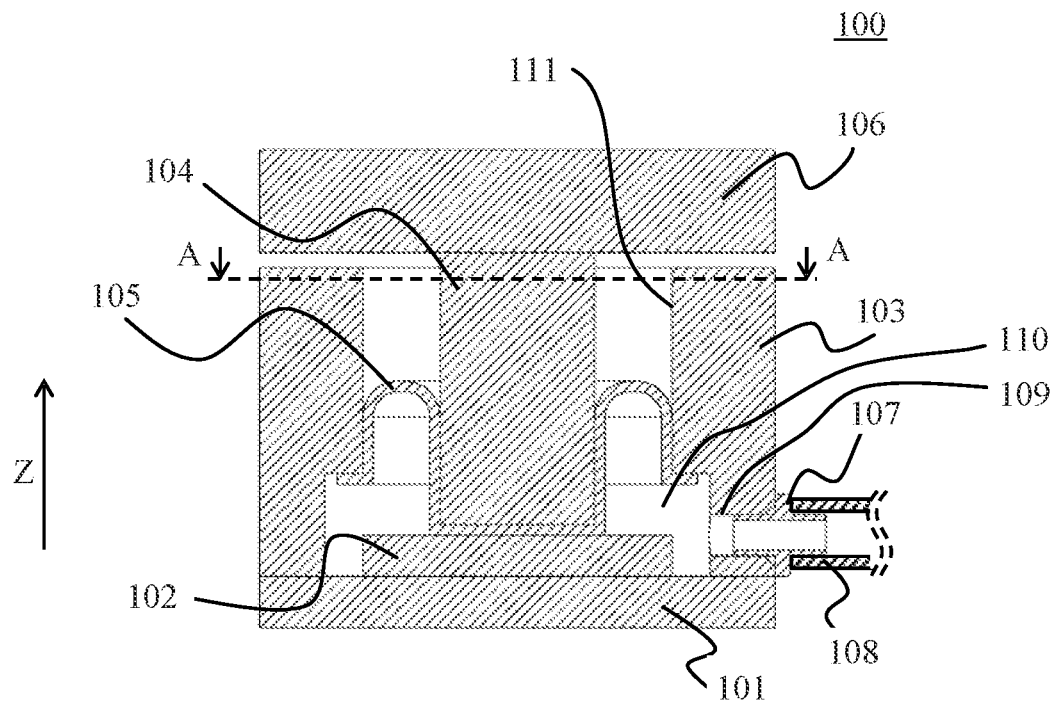
FIGS. 1A and 1B are sectional views of a vibration damping apparatus according to a first embodiment.
Figure 1B:
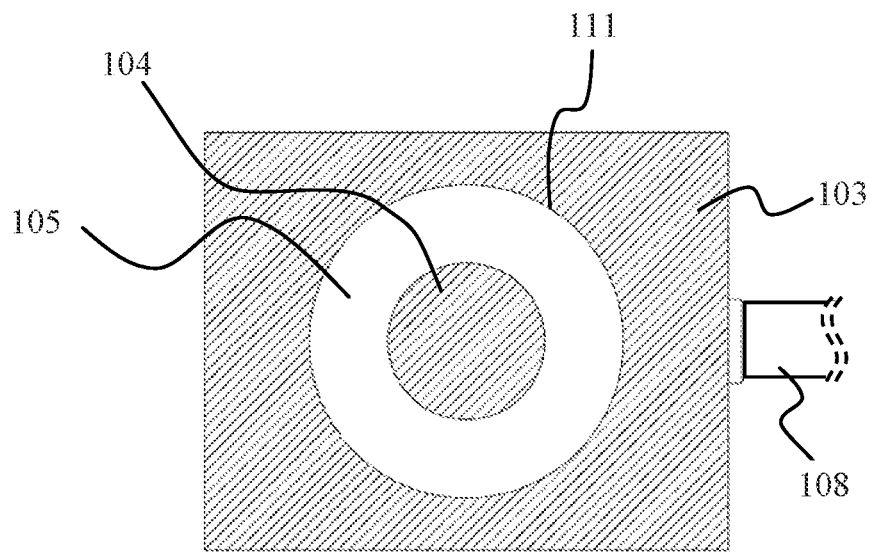

Referring now to FIGS. 1A and 1B, a description will be given of a configuration of a vibration damping apparatus (variable-rigidity vibration damping apparatus) 100 according to a first embodiment of the present invention. FIG. 1A is a sectional view of the vibration damping apparatus 100 according to this embodiment. FIG. 1B is a sectional view taken along a line A-A in FIG. 1A, and viewed from a vertical direction (Z-axis direction in FIG. 1A).

In the vibration damping apparatus 100, a base 101 is fastened to a vibrating target member (target member) to be damped. A damping member 102 is attached to the base 101. A support member 104 is provided to the damping member 102 on the side of the damping member 102 opposite to the base 101. A mass body 106 is provided to the other end of the support member 104 (on the side of the support member 104 opposite to the damping member 102). A housing 103 is fastened to the base 101. One end of an elastic member 105 such as a diaphragm or a bellofram is attached to the one end of the support member 104 on the side of damping member 102. The other end of the elastic member 105 is attached to the housing 103. A hole 109 is formed in the housing 103, and an inlet port 107 for sucking compressed air is provided in a space 110 formed by the elastic member 105 and the housing 103. A piping member 108 is inserted into the inlet port 107, and compressed air whose pressure is controlled is suppliable to the space 110 formed by the elastic member 105 and the housing 103.

In this embodiment, the elastic member 105 connects the housing 103 and the support member 104 to each other, and its rigidity changes according to the pressure of the compressed air. The support member 104 is disposed between the elastic member 105 and the mass body 106 in the vertical direction, and restricted from moving in the vertical direction by the damping member 102.

As illustrated in FIG. 1B, a circular hole 111 is formed in the housing 103. The support member 104 has a cylindrical shape disposed inside the hole 111 (or circular section when viewed from the vertical direction). This structure can prevent the effect of the vibration damping apparatus 100 from having anisotropy.

Figure 2A:
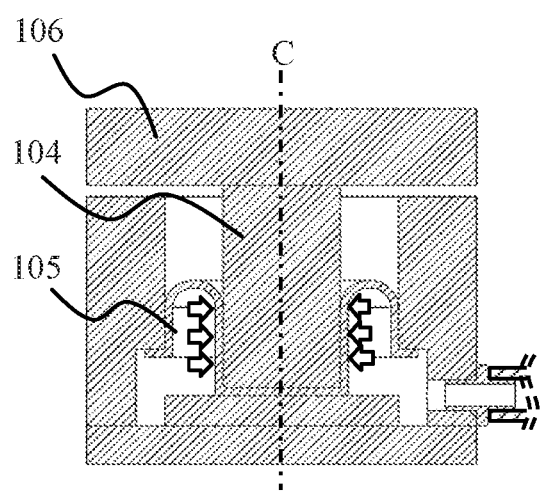
FIGS. 2A and 2B explain the vibration damping apparatus according to the first embodiment.
Figure 2B:
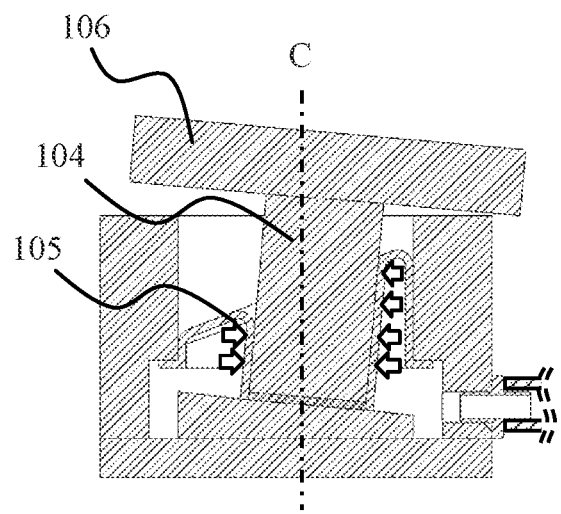

Referring now to FIGS. 2A and 2B, a description will be given of the operation of the vibration damping apparatus 100. FIGS. 2A and 2B explain the vibration damping apparatus 100, FIG. 2A illustrates a case where the support member 104 is located at the center, and FIG. 2B illustrates a case where the support member 104 is located off the center.

It is known that the elastic member 105 has an automatic centripetal action. As illustrated in FIG. 2A, in the case where the support member 104 is located at the center, the elastic member 105 contacts the support member 104 uniformly (so that the depth of the groove formed by the elastic member 105 is constant). On the other hand, as illustrated in FIG. 2B, in the case where the mass body 106 and the support member 104 vibrate, the depth of the groove formed by the elastic member 105 becomes deeper as the width becomes narrower and shallower as the width becomes wider. At this time, a restoring force acts in a direction from the narrow side to the wide side of the groove, and the support member 104 is returned to the center position (centerline C). Since the magnitude of this restoring force is proportional to the pressure of the supplied gas (compressed air) and an eccentricity amount of the support member 104, the rigidity of the vibration damping apparatus 100 can be controlled by controlling the pressure of the supplied gas.

The natural frequency of the vibration damping apparatus 100 is determined based on the mass body 106 and the rigidity. Therefore, the natural frequency of the vibration damping apparatus 100 can be controlled by controlling the rigidity. This configuration can reduce the vibration of the target by causing the mass body 106 to absorb the vibration of the target and vibrate instead.

Figure 3A:
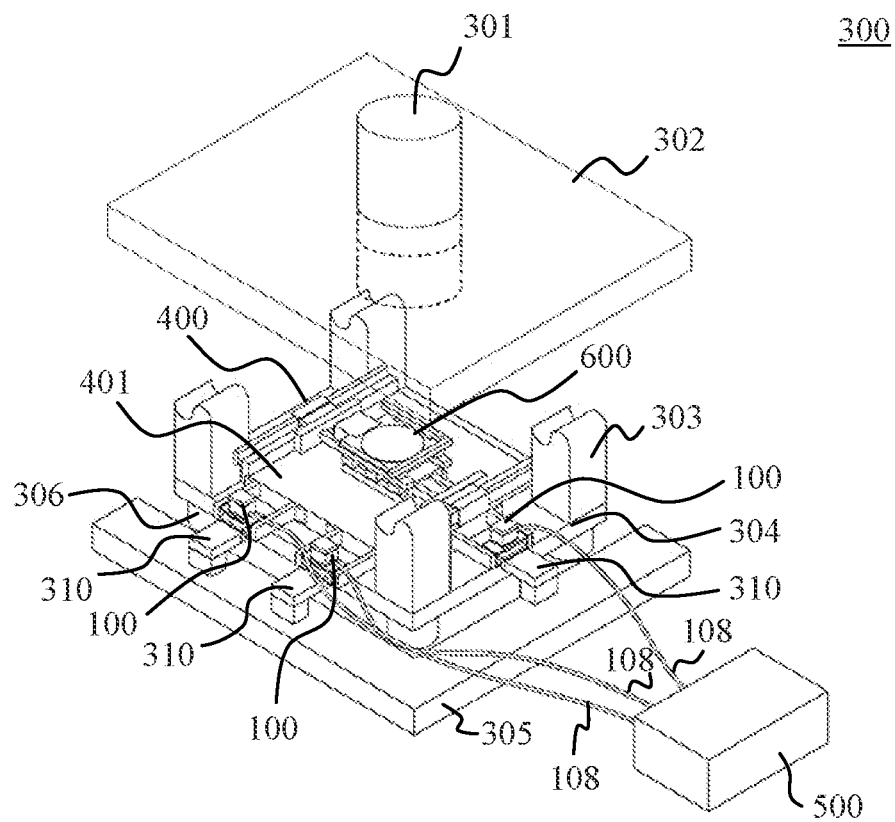
FIGS. 3A and 3B are structural views of a reaction force processing system according to each embodiment.
Figure 3B:
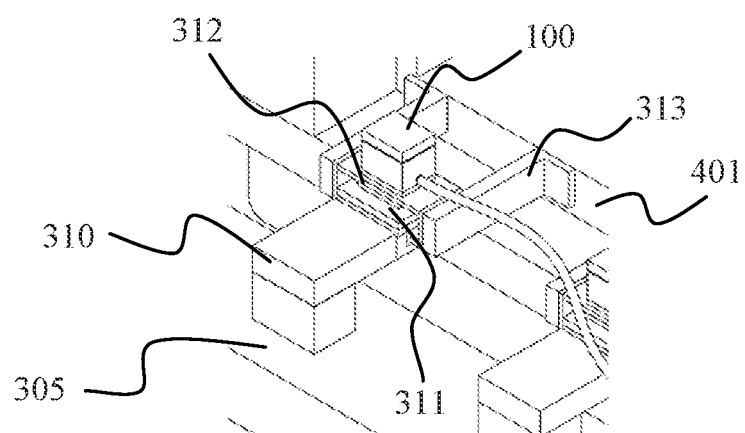

Referring now to FIGS. 3A and 3B, a description will be given of a reaction force processing system 310 that includes the vibration damping apparatus 100 according to this embodiment. FIG. 3A is a structural view of an exposure apparatus 300 provided with the reaction force processing system 310. FIG. 3B is a detailed view of the reaction force processing system 310.

In the exposure apparatus 300, a projection optical system 301 is mounted on a top frame 302. The top frame 302 is connected to a bottom frame 304 via a pillar member 303. A platen 401 provided with a traveling surface of the stage apparatus 400 is mounted on the bottom frame 304. The stage apparatus 400 is mounted movably on the traveling surface.

A chuck (not shown) provided on the stage apparatus 400 holds a substrate 600 to be exposed. This structure exposes a pattern of an original (not shown) onto a plurality of exposed areas on the substrate via the projection optical system 301 while the stage apparatus 400 is stepped. The exposure apparatus 300 is provided with a vibration isolating table 306 between the bottom frame 304 and the floor so as to prevent external vibration from being transmitted from the floor to the stage apparatus 400.

The reaction force processing system 310 in the exposure apparatus 300 is attached to a base 305 fixed to the floor, and its other end is fixed to the platen 401 via a linear motor (thrust generator that generates magnetism) described later. As illustrated in FIG. 3B, in the reaction force processing system 310, a housing 311 is fixed to a frame extending from the base 305, and a coil (not shown) is provided inside the housing 311. A magnet 312 is provided on the housing 311 via a gap. The magnet 312 is attached to the platen 401 via the frame 313. The housing 311 and the magnet 312 in the linear motor do not mechanically contact each other, and are configured so that the vibration of the floor is not transmitted to the bottom frame 304 via the reaction force processing system 310.

The reaction force processing system 310 generates a compensation force that cancels the reaction force generated when the stage apparatus 400 is stepped. This embodiment attaches the housing 311 provided with a coil to the base 305 and the magnet 312 to the platen 401, but the present invention is not limited to this embodiment and may use a reverse configuration. This embodiment attaches the reaction force processing system 310 to the platen 401, but may attach it to the bottom frame 304 or the pillar member 303.

In the reaction force processing system 310, the vibration damping apparatus 100 is disposed on a structure fastened to the platen 401. The piping member 108 is attached to the vibration damping apparatus 100, and connected to a control unit 500. The control unit 500 controls (adjusts) the pressure of the compressed air.

Figure 4:
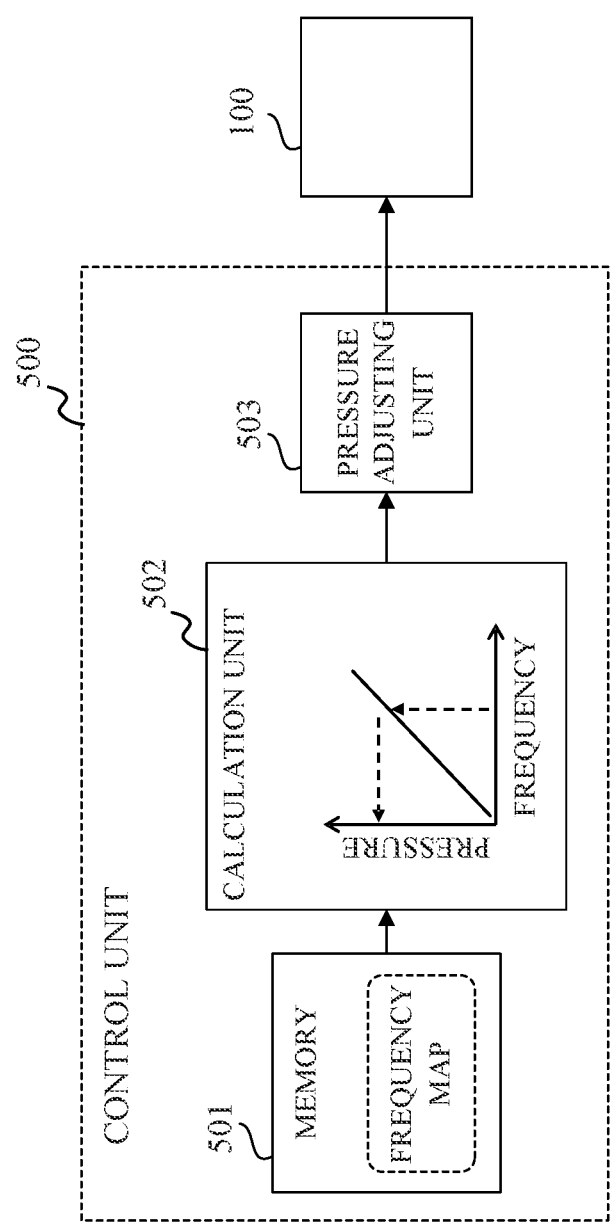
FIG. 4 is a block diagram of a control unit according to each embodiment.

Referring now to FIG. 4, a description will be given of the control unit 500 of the vibration damping apparatus 100. FIG. 4 is a block diagram of the control unit 500. The control unit 500 includes a memory 501, a calculation unit 502, and a pressure adjusting unit 503. While FIG. 4 illustrates the control unit 500 that is separated from the vibration damping apparatus 100, the control unit 500 may form part of the vibration damping apparatus 100.

The memory 501 stores a frequency map between a position of the stage apparatus 400 and a compensation force at each position. The calculation unit 502 determines the natural frequency (target frequency) of the vibration damping apparatus 100 based on the frequency map stored in the memory 501, and determines the supplied pressure of the compressed air based on the target frequency. The pressure adjusting unit 503 controls the pressure of the compressed air, which is supplied into the vibration damping apparatus 100 via the inlet port 107. Thereby, the natural frequency of the vibration damping apparatus 100 can be adjusted to the vibration frequency of the reaction force processing system 310 of the exposure apparatus 300, and the vibration of the reaction force processing system 310 can be effectively attenuated. As a result, the vibration of the bottom frame 304 of the exposure apparatus 300 can be suppressed and the exposure performance can be improved.

That is, in this embodiment, the control unit 500 may control the pressure of the compressed air so as to change the natural frequency of the vibration damping apparatus 100. The control unit 500 may determine the natural frequency of the vibration damping apparatus 100 based on the frequency of the compensation force that cancels the reaction force, and control the pressure of the compressed air based on the natural frequency. The control unit 500 may determine the natural frequency of the vibration damping apparatus 100 based on the frequency map of the compensation force stored in the memory 501.

In this embodiment, the fluid supplied to the vibration damping apparatus 100 is compressed air, but the present invention is not limited to this embodiment, and may supply another fluid such as water and oil via the inlet port 107. In this embodiment, a single vibration damping apparatus 100 is mounted on a single reaction force processing system 310, but the present invention is not limited to this embodiment. A plurality of vibration damping apparatuses 100 may be mounted on a single reaction force processing system. At this time, by changing the frequency of each vibration damping apparatus, the vibration component of each frequency can be reduced.

Second Embodiment

Figure 5:
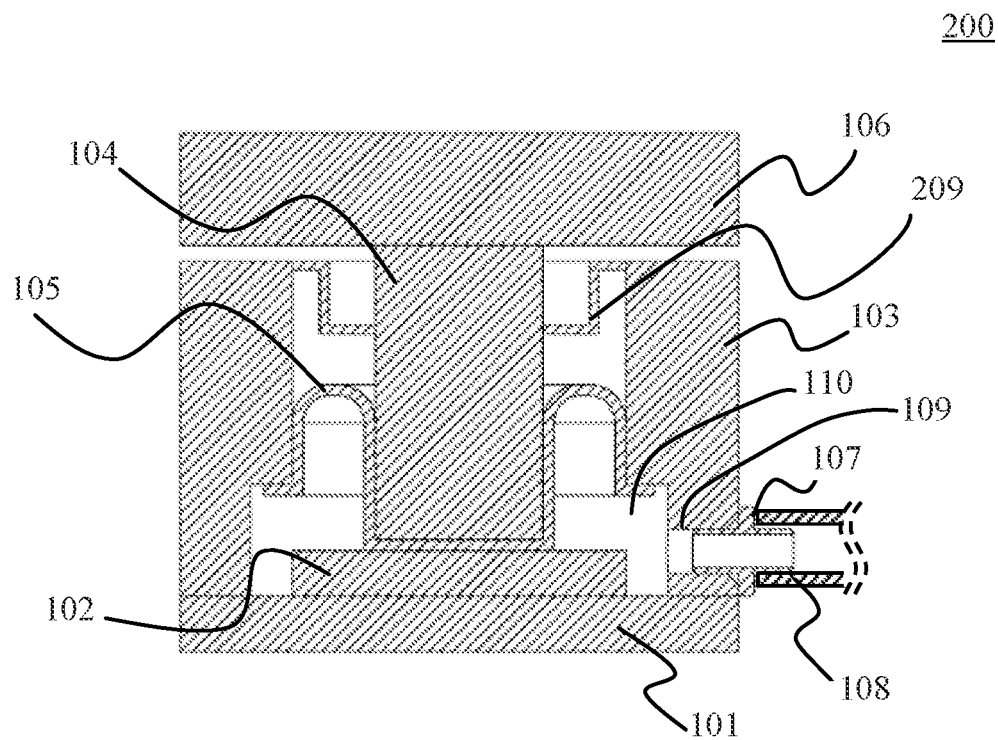
FIG. 5 is a sectional view of a vibration damping apparatus according to a second embodiment.

Referring now to FIG. 5, a description will be given of a structure of a vibration damping apparatus (variable-rigidity vibration damping apparatus) 200 according to a second embodiment of the present invention. FIG. 5 is a sectional view of the vibration damping apparatus 200 according to this embodiment.

The vibration damping apparatus 200 according to this embodiment is different from the vibration damping apparatus 100 according to the first embodiment in that the vibration damping apparatus 200 includes a second elastic member 209. Since the other configuration is similar to that of the first embodiment, a description will be omitted by designating the configuration having the same function by the same reference numeral.

The second elastic member 209 connects the support member 104 and the housing 103 to each other. This configuration can connect the support member 104 and the housing 103 to each other using not only the elastic member 105 but also the elastic member provided in parallel with the elastic member 105. For example, by forming the second elastic member 209 with a spring member (spring element) such as a metal leaf spring, reliability such as performance and durability can be improved.

Substrate Processing Apparatus

A substrate processing apparatus according to another embodiment of the present invention will be described. This embodiment will describe an exposure apparatus that exposes a substrate to form a pattern on the substrate, as an example of the substrate processing apparatus, but the present invention is not limited to this example. For example, the present invention is also applicable to a substrate processing apparatus such as an imprint apparatus that forms a pattern of an imprint material on a substrate using a mold, and a drawing apparatus that irradiates a substrate with charged particle beams to form a pattern on the substrate. The present invention is also applicable to a substrate processing apparatus such as a coater for applying a photosensitive medium onto a surface of a substrate and a developer for developing the photosensitive medium on which a pattern is transferred. The present invention is also applicable to a substrate processing apparatus such as a film forming apparatus (such as a CVD apparatus), a processing apparatus (such as a laser processing apparatus), an inspection apparatus (such as an overlay inspection apparatus), and a measuring apparatus (such as a mark measuring apparatus).

Figure 6:
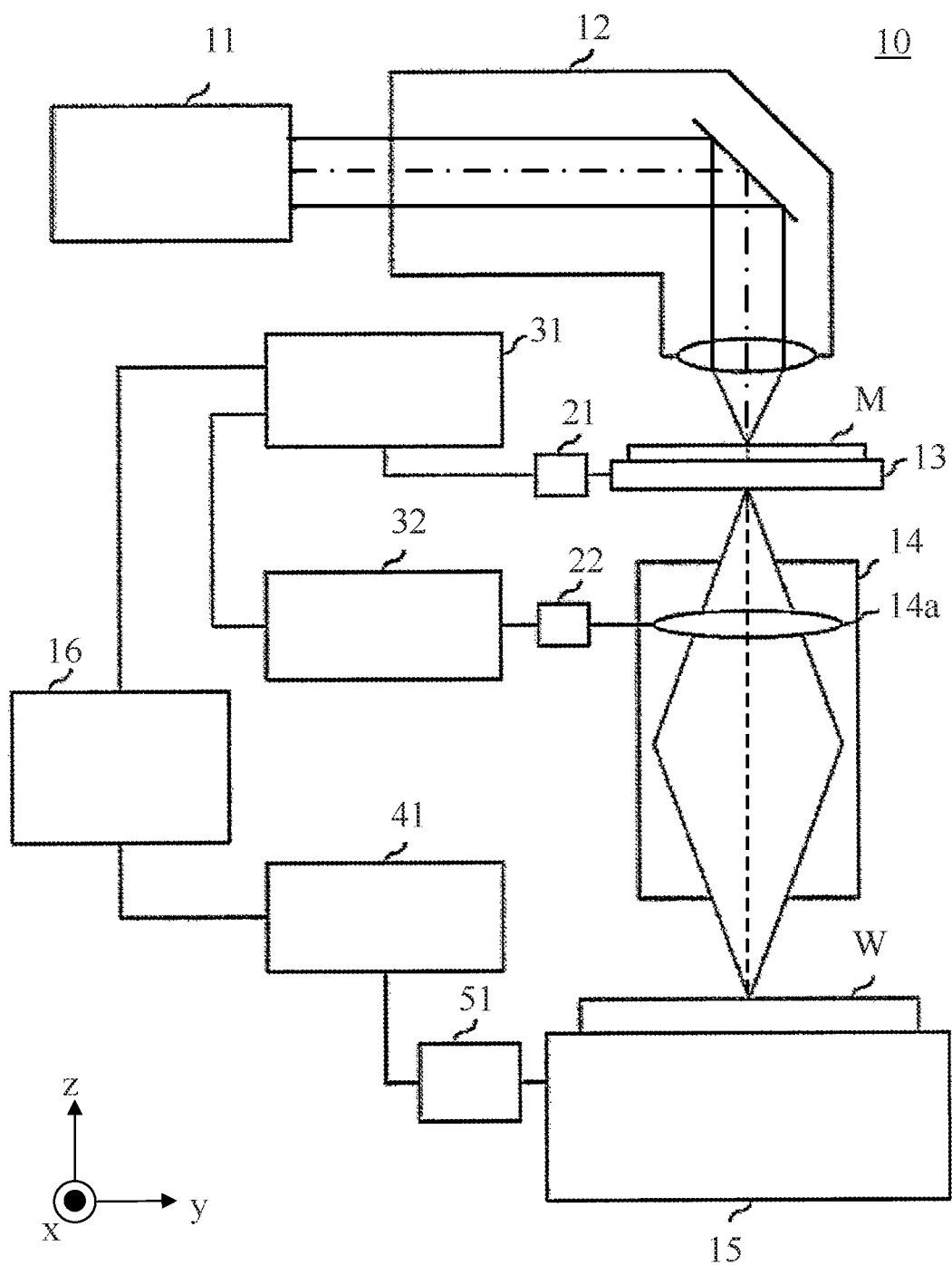
FIG. 6 is a configuration diagram of an exposure apparatus that includes the vibration damping apparatus according to each embodiment.

FIG. 6 illustrates a configuration of the exposure apparatus 10. The exposure apparatus 10 is an exposure apparatus that exposes a substrate W by projecting an image of a pattern on a mask M onto the substrate W via a projection optical system 14. The exposure apparatus 10 and the substrate W in FIG. 6 correspond to the exposure apparatus 300 and the substrate 600 in FIGS. 3A and 3B, respectively. Here, a Z-axis direction is defined as a direction parallel to an optical axis of the projection optical system 14, and an X-axis direction and a Y-axis direction are defined as two directions orthogonal to each other in the plane orthogonal to the Z-axis direction. θX, θY, and θZ are defined as a rotation around the X-axis, a rotation around the Y-axis, and a rotation around the Z-axis, respectively.

The exposure apparatus 10 includes a light source 11, an illumination optical system 12, a mask stage 13, a projection optical system 14, a substrate stage 15, and a main control unit 16. The exposure apparatus 10 further includes a first drive unit 21 that drives the mask stage 13, a second drive unit 22 that drives an optical element (lens) 14a of the projection optical system 14, and a third drive unit 51 that drives the substrate stage 15. The first drive unit 21, the second drive unit 22, and the third drive unit 51 are mechanisms that perform at least part of processing of forming a pattern on the substrate W, and are controlled by a mask stage control unit 31, a projection control unit 32, and a substrate stage control unit 41, respectively. The main control unit 16 includes, for example, a CPU (processing unit), a memory, and the like, and controls the mask stage control unit 31, the projection control unit 32, and the substrate stage control unit 41 to control the entire exposure apparatus 10 (each component of the exposure apparatus 10).

The light source 11 emits exposure light. The illumination optical system 12 illuminates the mask M using the light emitted from the light source 11. The mask stage 13 holds the mask M and can be movable by the first drive unit 21, for example, in a plane orthogonal to the optical axis of the projection optical system 14, that is, in an XY plane. The projection optical system 14 projects an image of the mask M pattern illuminated by the illumination optical system 12 onto the substrate. The projection optical system 14 includes the optical element 14a that can be moved, for example, in the X-axis direction by the second drive unit 22. The substrate stage 15 can hold the substrate W and, for example, move in the XY plane and rotate in OZ by the third drive unit 51.

Manufacturing Method of Article

A method for manufacturing an article according to another embodiment of the present invention is suitable to manufacture a microdevice such as a semiconductor device, a device having a fine structure, and an article such as a flat panel display. The method for manufacturing the article according to this embodiment includes the steps of processing a substrate using the above substrate processing apparatus, and manufacturing the article from the substrate processed in the above step. This manufacturing method may further include the well-known step (exposure, oxidation, film formation, vapor-deposition, doping, flattening, etching, resist-stripping, dicing, bonding, packaging, etc.). The method for manufacturing the article according to this embodiment is more advantageous in at least one of the performance, quality, productivity, and production cost of the article than the conventional method.

Each embodiment can provide a vibration damping apparatus, a reaction force processing system, a stage apparatus, an exposure apparatus, a substrate processing device, and a method for manufacturing an article, each of which can support an actuator that utilizes a magnetic force.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-085831, filed on May 21, 2021, which is hereby incorporated by reference herein in its entirety.

What is claimed is:

1. A vibration damping apparatus configured to damping a vibration of a target member, the vibration damping apparatus comprising:
   a mass body;
   a base disposed on the target member;
   a support member disposed on the base and configured to support the mass body;
   a housing disposed on the base so as to surround the support member;
   an elastic member disposed so as to form a space in the housing and configured to apply a force to the support member; and
   a control unit configured to control a pressure of a fluid in the space by supplying the fluid to the space based on a vibration state of the target member.

2. The vibration damping apparatus according to claim 1, wherein the support member has a cylindrical shape,
   wherein the housing has a circular hole,
   wherein the support member is disposed inside the circular hole, and
   wherein the elastic member connects a side surface of the circular hole and a side surface of the support member to each other.

3. The vibration damping apparatus according to claim 2, further comprising a damping member configured to limit a movement in an axial direction of the cylindrical shape.

4. The vibration damping apparatus according to claim 1, wherein the elastic member includes a diaphragm or a bellofram.

5. The vibration damping apparatus according to claim 1, wherein the control unit controls the pressure so as to change a natural frequency of the vibration damping apparatus.

6. The vibration damping apparatus according to claim 5, wherein the target member is included in a system that generates the force, and
   wherein the control unit determines the natural frequency of the vibration damping apparatus based on a frequency of the force generated by the system, and controls the pressure based on the natural frequency.

7. The vibration damping apparatus according to claim 6, wherein the control unit determines the natural frequency of the vibration damping apparatus based on a frequency map of the force stored in a memory.

8. The vibration damping apparatus according to claim 1, further comprising a second elastic member configured to connect the housing and the support member to each other.

9. The vibration damping apparatus according to claim 1, wherein the fluid is compressed air.

10. The vibration damping apparatus according to claim 1, wherein the fluid is water.

11. The vibration damping apparatus according to claim 1, wherein the fluid is oil.

12. A stage apparatus comprising:
    a stage; and
    the vibration damping apparatus according to claim 1.

13. An exposure apparatus comprising:
    a projection optical system; and
    the vibration damping apparatus according to claim 1.

14. A substrate processing apparatus for processing a substrate, the substrate processing apparatus comprising:
    a stage configured to hold the substrate; and
    the vibration damping apparatus according to claim 1 configured to damp a vibration of the stage.

15. A reaction force processing system comprising:
    a vibration damping apparatus;
    a coil; and
    a magnet,
    wherein the vibration damping apparatus includes:
    a mass body;
    a base disposed on a target member;
    a support member disposed on the base and configured to support the mass body;
    a housing disposed on the base so as to surround the support member;
    an elastic member disposed so as to form a space in the housing and configured to apply a force to the support member; and
    a control unit configured to control a pressure of a fluid in the space by supplying the fluid to the space based on a vibration state of the target member.

16. A manufacturing method of an article, the manufacturing method comprising the steps of:
    processing a substrate using a substrate processing apparatus; and
    manufacturing the article from a processed substrate,
    wherein the substrate processing apparatus includes:
    a stage configured to hold the substrate; and
    a vibration damping apparatus configured to damp a vibration of the stage,
    wherein the vibration damping apparatus includes:
    a mass body;
    a base disposed on the stage;
    a support member disposed on the base and configured to support the mass body;
    a housing disposed on the base so as to surround the support member;
    an elastic member disposed so as to form a space in the housing and configured to apply a force to the support member; and
    a control unit configured to control a pressure of a fluid in the space by supplying the fluid to the space based on a vibration state of the target member.

* * * * *